(12) United States Patent
Ranganath et al.

(10) Patent No.: US 9,888,117 B1
(45) Date of Patent: Feb. 6, 2018

(54) HOLD TIME REDUCER

(71) Applicant: GetHuman, Inc., Boston, MA (US)

(72) Inventors: Nischit Ranganath, Quincy, MA (US);
Christian Allen, Belmont, MA (US);
Jeff Whelpley, Melrose, MA (US)

(73) Assignee: GetHuman, Inc., Boston, MA (US)

( * ) Notice: Subject to any disclaimer, the term of this patent is extended or adjusted under 35 U.S.C. 154(b) by 0 days.

(21) Appl. No.: 15/656,014

(22) Filed: Jul. 21, 2017

Related U.S. Application Data

(60) Provisional application No. 62/522,994, filed on Jun. 21, 2017.

(51) Int. Cl.
*H04M 3/00* (2006.01)
*H04M 5/00* (2006.01)
*H04M 3/51* (2006.01)
*H04M 3/523* (2006.01)

(52) U.S. Cl.
CPC ....... *H04M 3/5166* (2013.01); *H04M 3/5183* (2013.01); *H04M 3/5238* (2013.01)

(58) Field of Classification Search
CPC .. H04M 3/523; H04M 3/5231; H04M 3/5232; H04M 3/5238; H04M 3/428
USPC ............ 379/265.09, 266.01, 266.06, 265.11, 379/265.05, 266.08, 265.06, 265.07, 379/265.08
See application file for complete search history.

(56) References Cited

U.S. PATENT DOCUMENTS

| 8,463,939 | B1 | 6/2013 | Galvin |
| 8,831,184 | B2 | 9/2014 | Fan et al. |
| 9,560,210 | B1 * | 1/2017 | Noble, Jr. ............. H04M 15/60 |
| 9,578,175 | B2 | 2/2017 | Williams et al. |
| 9,621,727 | B2 | 4/2017 | Baranovsky |
| 9,769,315 | B2 * | 9/2017 | Jay ..................... H04M 3/5233 |
| 2016/0344870 | A1 | 11/2016 | Nair |
| 2017/0013128 | A1 | 1/2017 | Sasidharan |

OTHER PUBLICATIONS

Eric Krapf, "Fonolo's iPhone App: Taps for the Traditional IVR?," in nojitter.com (www.nojitter.com/post/225401002/fonolos-iphone-app-taps-for-the-traditional-ivr), Feb. 12, 2010.
Enghouse Interactive, "Mobile IVR Navigator," in enghouseinteractive.com (www.enghouseinteractive.com/products/self-service/mobile-ivr/). Oct. 26, 2015.

* cited by examiner

*Primary Examiner* — Thjuan K Addy
(74) *Attorney, Agent, or Firm* — Clocktower Law; Erik J. Heels; Michael A. Bartley

(57) ABSTRACT

The system allows a consumer to shortcut through a call queue to reach a human agent faster. For phone or voice-based calls that require a consumer wait on hold, the system can give that consumer an accurate estimate of the wait time and allow them to skip all or some of it. It does this by using automated processes to proactively dial and wait in those call queues, measuring their time in queue. A new consumer making an incoming call can then join the call queue occupied by of those automated processes, shortcutting the consumer past all or some of the wait time.

35 Claims, 2 Drawing Sheets

HOLD TIME REDUCER

CROSS-REFERENCE TO RELATED APPLICATIONS

This utility patent application claims priority from U.S. provisional patent application Ser. No. 62/522,994, filed 2017 Jun. 21, titled "HOLD TIME REDUCER" in the name of Nischit Ranganath, Christian Allen, and Jeff Whelpley.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2017 GetHuman, Inc.

BACKGROUND OF THE INVENTION

Field of the Invention

The HTR system relates to automatic dialing, via phone or other communication mechanism, for entities that utilize a phone system for incoming callers.

Background

Companies and institutions of all sizes today use phone systems with a combination of server-side phone and voice technology to queue and route incoming phone traffic. Collectively, these server-side technologies are designed to save money for the companies and institutions that use them.

From the client-side, namely the perspective of the user or consumer trying to call a particular company, for example for customer support, these server-side technologies, including interactive voice response (IVR) systems (en.wikipedia.org/wiki/Interactive_voice_response), are a source of frustration and delay.

In 2005, to address this frustration, Boston entrepreneur Paul M. English (en.wikipedia.org/wiki/Paul_M._English) published the "IVR Cheat Sheet" on his personal website (paulenglish.com/ivr/), which included "tips to bypass phone systems to quickly find a human" (paulenglish.com/phones/). Categories of companies on the IVR cheat sheet included finance, government, insurance, pharmacy, products, retail, shipping, technology, telco, travel, and TV/satellite. On Feb. 2, 2006, the IVR Cheat Sheet was replaced with a new dedicated website and service named GetHuman (www.gethuman.com). Since 2006, GetHuman has helped customers solve customer service problems.

GetHuman's Hold Time Reducer (HTR) system described herein programmatically initiates calls to phone systems and other voice-based communications systems that use queuing mechanisms, and the HTR system manages and optimizes the process of waiting in queues. The primary user of the HTR system is a consumer who wants to get through an organization's IVR tree and phone queue in order to talk to a live agent. For example, a consumer who needs to have a customer service issue solved and would like to avoid waiting on hold for an unreasonably long period of time.

Description of Prior Art

There are two general categories of existing products that somewhat relate to the HTR system: IVR-related products and "call back" services.

IVR-related products are server-side products used by organizations to manage incoming phone calls from consumers. In contrast, the HTR system is a client-side product built for and used by consumers to get through an organization's phone system faster and talk to a live human agent at that organization.

"Call back" services such as LucyPhone.com will call an organization for you and then call you back once they have a human agent. However, the big difference is that, unlike the HTR system, "call back" services do not actually get you to a human agent faster. "Call back" services just potentially eliminate the need for consumers to wait on hold. The HTR system, in contrast, reduces the amount of time to reach a human agent. So, for example, if the current hold time at an organization is 60 minutes, then a service like LucyPhone.com would take at least 60 minutes to get you to a live human agent before it calls you back. Using the HTR system in that same scenario, on the other hand, could potentially get you to a live human agent within 2 minutes.

U.S. PATENTS

U.S. Pat. No. 9,578,175 (issued 2017 Feb. 21, name WILLIAMS ET AL., title "COMMUNICATION DEVICE FOR ESTABLISHING AUTOMATED CALL BACK USING QUEUES") discloses, in the Abstract, "A communication device is provided for enabling a user to establish an automated call back from a communication system, such as a call center, for example. A software device application enables the communication device to communicate with the call center through the exchange of data. The communication device includes a display screen for displaying controls for allowing the user to interact with the communication system. The controls allow the user to request a list of providers from which to select a provider or company to contact. The communication device further provides controls for allowing the user to select a queue to join from a list of queues associated with the selected provider. An embodiment may also communicate contextual data between a communication device and a communication system, including information associated with the user of the communication device and information used to assist, instruct, or solve a user's problem."

U.S. PATENT APPLICATION PUBLICATIONS

United States Patent Application Publication US20160344870 (published 2016 Nov. 24, name RAHUL NAIR, title "INTERACTIVE VOICE RESPONSE VALET") discloses, in the Abstract, "Methods, systems, and computer program products for providing interactive voice response (IVR) valet services are disclosed. A computer-implemented method may include receiving data associated with an interactive voice response system, generating a graphical user interface that allows a user to visually select services offered by the interactive voice response system, displaying the graphical user interface for the interactive voice response system to the user, providing the user with self-service information from the interactive voice system via the graphical user interface, initiating a communication to operate the interactive voice response system on the user's behalf, operating the interactive voice response system on the user's behalf in view of a user selection received via the graphical user interface, waiting on the user's behalf when the communication involving with the interactive voice response system is on hold, and connecting the user to the communication when a live person is responsive to the communication."

United States Patent Application Publication US20170013128 (published 2017 Jan. 12, name SHAN K. SASIDHARAN ET AL., title "INTERACTIVE VOICE RESPONSE (IVR) SYSTEM INTERFACE") discloses, in the Abstract, "A mobile device, such as a smart phone, receives and presents interactive audio content from an interactive voice response (IVR) system. The mobile device provides an interface that enables a user to navigate through a menu presented in the interactive content. The interface further presents action elements that identify actions that can be requested through the menu, and selection of the one of the action elements may cause the IVR to perform an associated action. For example, the interface may identify representatives at a call center, and a selection of one of the action elements causes the IVR to establish a communication between the mobile device and the selected representative. The action elements may further identify status information associated with the call center, such as an expected wait time."

NON-PATENT LITERATURE DOCUMENTS

Non-Patent Literature Document by ERIC KRAPF, "Fonolo's iPhone App: Taps for the Traditional IVR?" in No Jitter (www.nojitter.com/post/225401002/fonolos-iphone-app-taps-for-the-traditional-ivr), Dec. 12, 2010, discloses Fonolo, an "IVR navigation tool for the iPhone" that "avoid[s] the frustration of slowly, methodically navigating through voice IVR menus, and quickly use a visual representation to get to where you want to go more easily" and allows users to "essentially 'bookmark' a particular level of an enterprise's IVR menu—if you're always calling customer service or reservations or whatever, you can make that your one click call to the company—no need to navigate through an audio IVR you know by heart from calling it so many times."

Non-Patent Literature Document by ENGHOUSE INTERACTIVE, "Mobile IVR Navigator" on EnghouseInteractive.com (www.enghouseinteractive.com/wp-content/uploads/2015/11/Product-Sheet-Mobile-IVR-Navigator.pdf), Oct. 26, 2015, discloses: "Enghouse Interactive's Mobile IVR Navigator is an innovative new development framework that allows you to build your mobile application. Using a web-based connection to any Enghouse Interactive Communications Portal IVR call flow, it presents options to users via their smartphone, tablet, or other mobile device. With no telephony resources required, the mobile IVR platform operates parallel to voice platforms without reducing capacity and enabling customers to take advantage of multi-media interactions anywhere, anytime." The following benefits are disclosed: "(1) Increase customer satisfaction: Allow customers to visually access their preferred communication channel and view availability/wait times for each (2) Reduce call times: Assure customers only connect once an agent has been secured through virtual queueing. Use pre-interaction time to capture key information. (3) Increase the number of correctly-routed calls: Reduce the number of times callers "zero-out" to bypass voice menus by making IVR navigation more user friendly. (4) Reduce quantity of calls into your contact center: Provide a more intuitive, visual self-service option that entices customers to handle more inquiries through agent-less channels—in turn reducing the amount of inbound lines into your business as well. (5) Increase IVR platform capacity: Add visual navigation capabilities without reducing voice capacity of your current IVR."

None of the above provides a hold time reducer that (1) allows a person to take the place of a process (2) already waiting in a phone queue (3) for the purpose of reaching a human agent at that organization in less time than if that person tried to call on their own. What is needed, therefore, is a hold time reducer that overcomes the above-mentioned limitations and that includes the features enumerated above.

BRIEF SUMMARY OF THE INVENTION

We are trying to solve the problem of a consumer spending too much time in a call queue waiting to reach the end of the queue—in most cases, reaching the end of the queue means talking to a human agent. The HTR system solves this issue by managing a group of automated computer processes that initiate calls via phone or other voice-based communications platform, find their way through IVR trees to a call queue, and then wait in that queue. A voice-based call from a consumer can take the place of a process that has been waiting in the phone queue, and in most cases the consumer associated with the joining call will be in queue for less time than if they had initiated their call without the HTR system.

Features and Advantages

There are three primary features of the HTR system.

First—Automatic Dialing and Phone Queue Navigation.

The processes that are part of the HTR system will automatically call an organization and respond to any prompts from the organization's IVR (e.g. "press 1 for our billing department"). The advantage of this feature is that consumers who use the HTR system do not need to know which phone number they should call or how to navigate through an organization's IVR tree to get to a live human agent.

Second—Allowing a Person to Take the Place of a Process Already Waiting on Hold.

A consumer who wants to talk to a human agent at an organization can take the place of a process that is already waiting on hold for that organization. The advantage of this feature is that the consumers will wait less time to reach the human agent than if they called the organization on their own.

Third—Automatic Dial-and-Queue Process Management.

A process manager monitors the health and status of all dial-and-queue processes. The advantage of this feature is that it ensures the scalability and robustness of the HTR system as a whole. For scalability, the process manager automatically scales up or scales down dial-and-queue processes for a given organization based on the number of consumers using the HTR system seeking to reach that organization. For robustness, the process manager detects call failures and automatically reconnects consumers using the HTR system with the organization they were calling.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION OF THE INVENTION, INCLUDING THE PREFERRED EMBODIMENT

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Terminology

The terminology and definitions of the prior art are not necessarily consistent with the terminology and definitions of the current invention. Where there is a conflict, the following definitions apply.

Agent (or organization agent)—A human at an organization who answers phone calls and addresses the needs of consumers.

Client application—Any user interface application that is used to communicate with the process manager. For example, a mobile app, a desktop app, a web-based app.

Consumer—A person wanting to talk to a live human agent at an organization.

Dial-and-queue process—An automated process that calls a phone system, navigates an organization's IVR phone tree (IVR tree), then waits on hold in a queue, and takes other appropriate actions (such as "press 1 to continue holding") with the IVR and/or the agent.

Hold time reducer (HTR)—See SYSTEM.

Interactive Voice Response (IVR)—A term used to describe the technology used to implement menu options in a voice-based communications system (such as a phone system) to help route calls. For example, if you call a phone system and are greeted by a message saying "Press 1 for Department X, or Say 'Billing' for the Billing Department, or stay on the line to talk to a person," then you are listening to an IVR system.

Organization—A company or another entity which has a phone system with some sort of queueing mechanism for inbound calls.

Phone system—A combination of technology and people that typically includes (1) an IVR to answer incoming calls and route them to appropriate departments within the organization and (2) a queuing system for callers to wait in line to talk to a live human agent.

Process manager—An automated system that monitors all dial-and-queue processes and ensures scalability, reliability, and robustness.

Queuer—A person (such as a consumer) or an automated process (such as a dial-and-queue process) that is waiting in a call queue and/or intends to wait in a call queue.

System—The hold time reducer (HTR) product and service including all aspects of the product and service.

Operation

Figure 1:
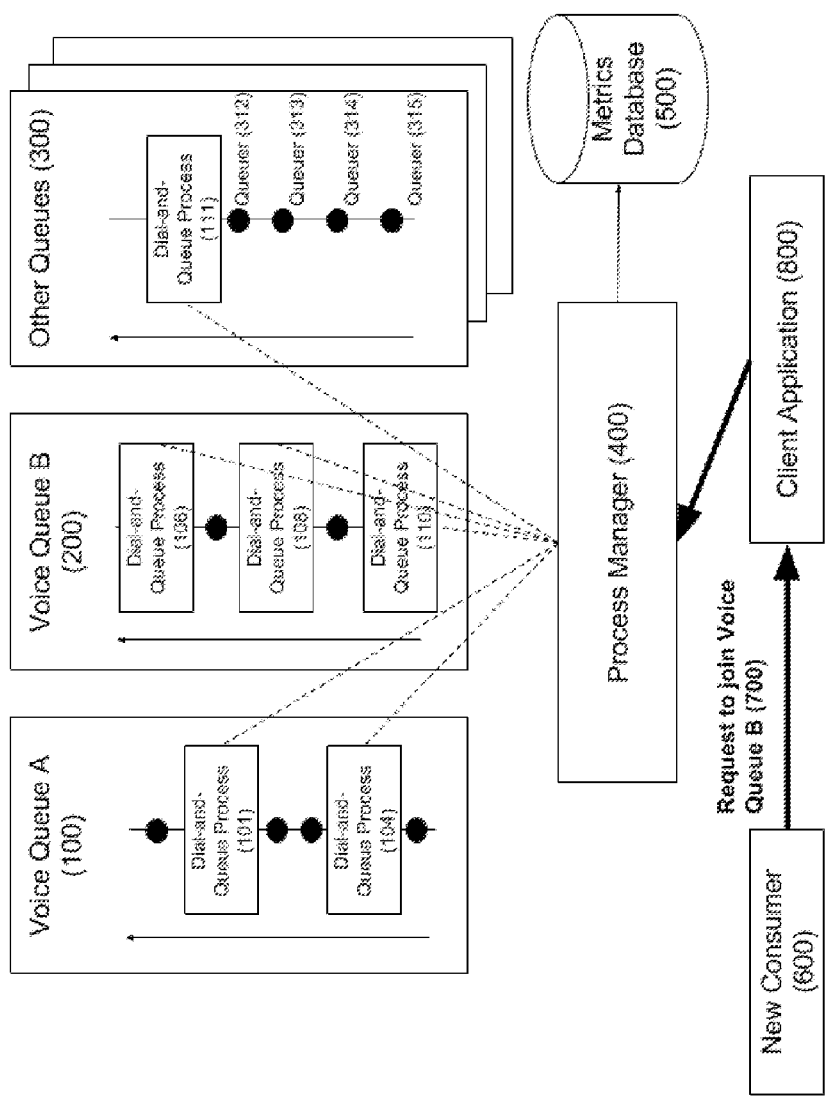
FIG. 1 is a high-level system diagram of the HTR system and also shows a "before" view of new consumer waiting to join a queue by using the HTR system.

Referring now to FIG. 1. Starting new dial-and-queue processes. Process manager 400 uses historical metrics stored in metrics database 500 for hold times and current user demand to determine the number and frequency of dial-and-queue processes (only dial-and-queue processes 101-111 are shown in FIG. 1 to illustrate how this works) to create and run for each target organization's phone queue. Voice queue A 100 represents the voice queue for organization A, voice queue B 200 represents the voice queue for organization B, and so on. Based on the metrics stored in metrics database 500, process manager 400 creates and runs one or more dial-and-queue processes (101-111 shown) at configurable intervals. Dial-and-queue processes created by process manager 400 maintain communication with and report their status and health to process manager 400 until they are terminated by process manager 400.

Navigating phone queue. Each dial-and-queue process (101-111 shown) uses information supplied by process manager 400 to call a target organization and navigate the organization's IVR tree to reach the end of the IVR tree and the beginning of the call queue. Each dial-and-queue process is maintaining an active phone call with the target organization and may have to periodically interact with the IVR and/or an agent to stay in the queue.

Continuing now with FIG. 1. Swapping a consumer for a dial-and-queue process. A new consumer 600, having the intent to reach a human agent at a given organization, uses client application 800 to send request to join voice queue B 700 to process manager 400. Process manager 400 receives and process request to join voice queue B 700, finds an available dial-and-queue process (dial-and-queue process 106 in this example) already in the appropriate queue (voice queue B 200 in this example), and then connects new consumer 600 to dial-and-queue process 106, which is an active call already in process. Progress manager 400 does this via a VoIP call made to client application 800, via a call made to the phone of new consumer 600, or via some other communication means.

Figure 2:
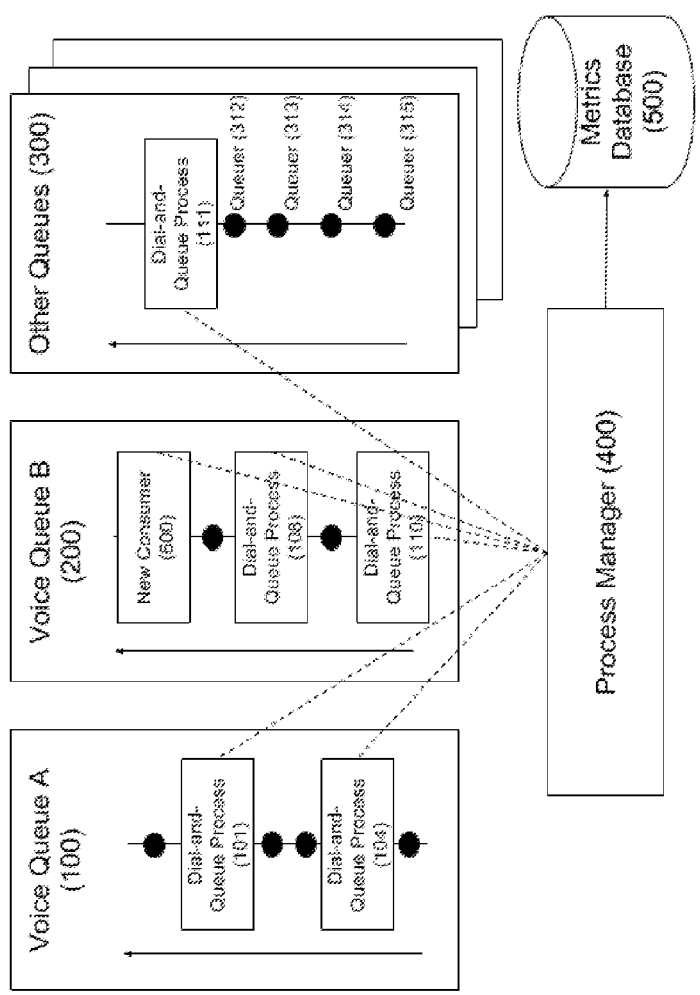
FIG. 2 is shows the "after" view of a new consumer having taken the place of a dial-and-queue process in a queue.

Referring now to FIG. 2. New consumer 600 has taken the place of dial-and-queue process 106 in voice queue B 200.

Terminating a dial-and-queue process. If a dial-and-queue process reaches the end of a call queue and no other queuers are requesting to join that queue, then the process manager terminates that dial-and-queue process.

Other Embodiments

In another embodiment, the HTR system works for international calls.

In another embodiment, the HTR system accurately predicts wait times and can guarantee a maximum wait time to an incoming queuer, such as "2 minutes".

In another embodiment, the HTR system works on any voice-based communication queue.

In another embodiment, the HTR system works on any digital communication queue, such as chat and video chat.

In another embodiment, the HTR system uses voice recognition technology to understand that it has reached the end of a call queue.

In another embodiment, the HTR system uses human behavior recognition technology to understand that it has reached the end of a call queue.

In another embodiment, the HTR system uses a call-back option when it has reached the end of a call queue.

In another embodiment, the HTR system begins a conversation with the organization agent reached after the call queue using information supplied to it before reaching the end of the queue.

In another embodiment, a dial-and-queue process has a full conversation with the organization agent reached after the call queue using information supplied to the dial-and-queue process before reaching the end of the queue.

In another embodiment, the HTR system is customized with personal information from the consumer. For example, the process manager collects the name and address of the consumer and then pass that info to the dial-and-queue process so that it can be used when a given organization's IVR asks "Please enter your name" and "Please enter your address."

In another embodiment of the HTR system, process manager 400 calculates and stores monetary values (not shown) associated with each dial-and-queue process, stores those values in metrics database 500, communicates those values to client application 800, and allows new consumers to buy specified dial-and-queue processes either directly or by auction with other new consumers. In this way, a new consumer can bid or buy their way to the frontmost location of a given queue.

In another embodiment, the HTR system automatically adjusts navigation paths based on call failure (i.e. a certain path is no longer valid) and/or detection of a more optimal route. A given company's IVR tree can have multiple endpoints, which allows the system to "race" different paths against one another. In other words, there may be 3 processes waiting in line for the "accounting" department, 2 other processes waiting in line for the "rebates" department, and another 5 processes in the queue for the "everything else" group. There could be a situation where we start off consumers in the "everything else" queue but then figure out that based on their specific problem and/or changes in the other queues, it would be more efficient to switch that consumer from the "everything else" queue to the "rebates" queue on the fly. The consumer will not know the difference, but the net result is that the consumer would reach a live agent faster than if we kept them in their original queue.

In another embodiment, the HTR system adds one or more custom dial-and-queue processes for a specific user with their personal information.

In another embodiment, the HTR system has the ability to switch a consumer from one dial-and-queue process to another for optimization purposes (i.e. the consumer has already has taken the place of one process, but then we switch them to a different process that the system thinks will work better).

In another embodiment, client application is selected from the group consisting of desktop application, tablet application, mobile phone application, and website application.

As will also be apparent to those skilled in the art, the Hold Time Reducer encompasses alternate embodiments of the software program in which the functions of the system are performed by modules different than those shown in the figures. The Hold Time Reducer may process the data in a serial or parallel fashion, or a combination of the two, without departing from the spirit or scope of the invention. Software programs used in the HTR system may be written in one of several widely available programming languages, and the modules may be coded as subroutines, subsystems, or objects depending on the language chosen. Similarly, data used by Hold Time Reducer is described and represented as logical records embodied in a database, but the invention is not limited to the described arrangement of data records, nor is the use of any particular type of data management system implied. Database systems from vendors such as Oracle, Sybase, Informix, or Microsoft provide the necessary infrastructure for managing the underlying data in the system, whether it is centralized or distributed, but other organizational data structures, e.g. indexed flat files or XML-based data structures, may be substituted without exceeding the scope of the invention. Telephony systems from vendors such as FreeSWITCH may provide the infrastructure for interacting with Voice-over-IP and PSTN voice communication systems, but other voice-communication-management systems may be substituted without exceeding the scope of the invention.

The various queues and processes may be implemented on one single physical server, multiple servers, virtual servers, distributed servers, or any combination thereof. The Hold Time Reducer may also be implemented as a program running on a server, or any hardware or software device operative to communicate with a server.

Furthermore, alternate embodiments of the invention that implement the Hold Time Reducer in hardware, firmware, or a combination of both hardware and software, as well as distributing the modules and/or the data in a different fashion will be apparent to those skilled in the art and are also within the scope of the invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A Hold Time Reducer (HTR) system that allows a consumer to shortcut through a phone system and to get to a call queue to reach a human agent at an organization faster comprising:
   a metrics database for storing metrics about hold times and consumer call queue demand for said call queues of said organizations;
   a process manager that uses said metrics to determine the number and frequency of dial-and-queue processes to create and run for each of said call queues associated with each of said organizations, launches the appropriate number of said dial-and-queue processes at the appropriate frequencies, and keeps in communication with each of said dial-and-queue processes to monitor the status and health of each of said dial-and-queue processes;
   wherein each of said dial-and-queue processes uses information supplied by said process manager to call said call queue and navigates said phone system of said organization to reach the end of an IVR tree of said organization and the beginning of said call queue of said organization;
   and wherein said consumer, having the intent to reach said human agent at one of said organizations, uses a client application to send a request to said process manager to reach one of said call queues of one of said organizations;
   and wherein said process manager receives said request, finds an available dial-and-queue process, and then makes a connection of said new consumer to said available dial-and-queue process;
   whereby said consumer takes the place of said available dial-and-queue process in said call queue.

2. A method of reducing hold time that allows a consumer to shortcut through a phone system and to get to a call queue to reach a human agent at an organization faster comprising:
   providing a metrics database for storing metrics about hold times and consumer call queue demand for said call queue of said organization;

providing a process manager that uses said metrics to determine the number and frequency of dial-and-queue processes to create and run for said call queue, launches the appropriate number of said dial-and-queue processes at the appropriate frequencies, and keeps in communication with each of said dial-and-queue processes to monitor the status and health of each of said dial-and-queue processes;

wherein each of said dial-and-queue processes uses information supplied by said process manager to call said call queue and navigates said phone system of said organization to reach the end of an IVR tree of said organization and the beginning of said call queue of said organization;

and wherein said consumer, having the intent to reach said human agent at said organization, uses a client application to send a request to said process manager to reach said call queue of said organization;

and wherein said process manager receives said request, finds an available dial-and-queue process, and then makes a connection of said consumer to said available dial-and-queue process;

whereby said consumer takes the place of said available dial-and-queue process in said call queue.

3. The method of claim 2 adapted to support one or more consumers, one ore more organizations, and one or more call queues.

4. The method of claim 2, wherein in said dial-and-queue process maintains an active phone call with said organization by periodically interacting with said IVR tree and/or said human agent to stay in said call queue.

5. The method of claim 2, wherein said connection is made via a VoIP call to said client application.

6. The method of claim 2 adapted to work for international calls.

7. The method of claim 2, wherein said process manager accurately predicts wait times and can guarantee a maximum wait time to an incoming queuer.

8. The method of claim 2 adapted to work for any voice-based communication queue.

9. The method of claim 2 adapted to work for any any digital communication queue, such as chat and video chat.

10. The method of claim 2, wherein said process manager uses voice recognition technology to understand that it has reached the end of said call queue.

11. The method of claim 2, wherein said process manager uses human behavior recognition technology to understand that it has reached the end of said call queue.

12. The method of claim 2, wherein said process manager uses a call-back option when it has reached the end of said call queue.

13. The method of claim 2, wherein said process manager begins a conversation with said human agent reached at the end of said call queue using information supplied to said process manager before reaching the end of said call queue.

14. The method of claim 2, wherein said dial-and-queue process has a full conversation said human agent reached at the end of said call queue using information supplied to said dial-and-queue process before reaching the end of said call queue.

15. The method of claim 2 adapted to collect personal information from said consumer and then pass said personal information to said dial-and-queue process so that it can be used when a said phone system asks for said personal information.

16. The method of claim 2, wherein said process manager calculates and stores monetary values associated with each of said dial-and-queue processes, stores said monetary values in said metrics database, communicates said monetary values to said client application, and allows said consumer to buy said available dial-and-queue process either directly or by auction with other consumers, whereby said consumer can bid or buy their way to the frontmost location of a said call queue.

17. The method of claim 2 adapted to move said consumer from one of said call queues to another of said call queues to reach said human agent faster.

18. The method of claim 2 adapted to add one or more of said dial-and-queue processes per said consumer.

19. A Hold Time Reducer (HTR) system that allows a consumer to shortcut through a phone system and to get to a call queue to reach a human agent at an organization faster comprising:

a metrics database for storing metrics about hold times and consumer call queue demand for said call queues of said organizations;

a process manager that uses said metrics to determine the number and frequency of dial-and-queue processes to create and run for each of said call queues associated with each of said organizations, launches the appropriate number of said dial-and-queue processes at the appropriate frequencies, and keeps in communication with each of said dial-and-queue processes to monitor the status and health of each of said dial-and-queue processes;

wherein each of said dial-and-queue processes uses information supplied by said process manager to call said call queue and navigates said phone system of said organization to reach the end of an IVR tree of said organization and the beginning of said call queue of said organization;

a client application used by said consumer, having the intent to reach said human agent at one of said organizations, that sends a request to said process manager to reach one of said call queues of one of said organizations; wherein said process manager receives said request, finds an available dial-and-queue process, and then makes a connection of said new consumer to said available dial-and-queue process; whereby said consumer takes the place of said available dial-and-queue process in said call queue.

20. The system of claim 19, wherein in said dial-and-queue process maintains an active phone call with said organization by periodically interacting with said IVR tree and/or said human agent to stay in said call queue.

21. The system of claim 19, wherein said connection is made via a VoIP call to said client application.

22. The system of claim 19 adapted to work for international calls.

23. The system of claim 19, wherein said process manager accurately predicts wait times and can guarantee a maximum wait time to an incoming queuer.

24. The system of claim 19 adapted to work for any voice-based communication queue.

25. The system of claim 19 adapted to work for any any digital communication queue, such as chat and video chat.

26. The system of claim 19, wherein said process manager uses voice recognition technology to understand that it has reached the end of said call queue.

27. The system of claim 19, wherein said process manager uses human behavior recognition technology to understand that it has reached the end of said call queue.

28. The system of claim 19, wherein said process manager uses a call-back option when it has reached the end of said call queue.

29. The system of claim 19, wherein said process manager begins a conversation with said human agent reached at the end of said call queue using information supplied to said process manager before reaching the end of said call queue.

30. The system of claim 19, wherein said dial-and-queue process has a full conversation said human agent reached at the end of said call queue using information supplied to said dial-and-queue process before reaching the end of said call queue.

31. The system of claim 19 adapted to collect personal information from said consumer and then pass said personal information to said dial-and-queue process so that it can be used when a said phone system asks for said personal information.

32. The system of claim 19, wherein said process manager calculates and stores monetary values associated with each of said dial-and-queue processes, stores said monetary values in said metrics database, communicates said monetary values to said client application, and allows said consumer to buy said available dial-and-queue process either directly or by auction with other consumers, whereby said consumer can bid or buy their way to the frontmost location of a said call queue.

33. The system of claim 19 adapted to move said consumer from one of said call queues to another of said call queues to reach said human agent faster.

34. The system of claim 19 adapted to add one or more of said dial-and-queue processes per said consumer.

35. The system of claim 19 where said client application is selected from the group consisting of desktop application, tablet application, mobile phone application, and website application.

* * * * *